US008215328B2

(12) United States Patent
Noll et al.

(10) Patent No.: US 8,215,328 B2
(45) Date of Patent: Jul. 10, 2012

(54) DUAL CHAMBER ADAPTER

(75) Inventors: Brad L. Noll, Atascadero, CA (US); William M. Orr, Paso Robles, CA (US); Frank Kock, Atascadero, CA (US)

(73) Assignee: Zurn Industries, LLC, Erie, PA (US)

(*) Notice: Subject to any disclaimer, the term of this patent is extended or adjusted under 35 U.S.C. 154(b) by 227 days.

(21) Appl. No.: 12/773,357

(22) Filed: May 4, 2010

(65) Prior Publication Data

US 2010/0212751 A1 Aug. 26, 2010

Related U.S. Application Data

(62) Division of application No. 11/937,059, filed on Nov. 8, 2007, now Pat. No. 7,905,250.

(51) Int. Cl.
*B08B 9/032* (2006.01)
*F16K 11/20* (2006.01)

(52) U.S. Cl. ...................... 137/15.01; 137/238; 137/597

(58) Field of Classification Search ............... 137/15.01, 137/15.04, 269, 270, 597, 238, 240; 138/116, 138/155; 285/120.1, 124.1, 12
See application file for complete search history.

(56) References Cited

U.S. PATENT DOCUMENTS

| | | | | |
|---|---|---|---|---|
| 998,843 | A | | 7/1911 | Dunn |
| 1,969,432 | A | | 8/1934 | Smith et al. |
| 3,169,545 | A | | 2/1965 | Kolling |
| 3,245,257 | A | | 4/1966 | Anderson |
| 3,946,754 | A | | 3/1976 | Cook |
| 4,327,760 | A | | 5/1982 | Lancaster |
| 4,372,337 | A | * | 2/1983 | Holzenberger ............... 137/240 |
| 4,690,434 | A | * | 9/1987 | Schmidt .......................... 285/12 |
| 5,355,905 | A | | 10/1994 | Burgess et al. |
| 5,392,803 | A | | 2/1995 | Bruce |
| 5,413,134 | A | | 5/1995 | Burgess et al. |
| 5,511,574 | A | | 4/1996 | Macke |
| 5,636,654 | A | * | 6/1997 | Helm ......................... 137/15.01 |
| 5,718,257 | A | | 2/1998 | Burgess |
| 5,732,744 | A | | 3/1998 | Barr et al. |
| 5,913,331 | A | | 6/1999 | Noll et al. |
| 6,026,845 | A | | 2/2000 | Walrath et al. |
| 6,109,293 | A | | 8/2000 | Walrath et al. |
| 6,279,595 | B1 | | 8/2001 | Walrath et al. |
| 6,431,519 | B1 | | 8/2002 | Smith |
| 6,513,543 | B1 | | 2/2003 | Noll et al. |
| 6,557,576 | B2 | | 5/2003 | Walrath et al. |
| 2003/0192593 | A1 | | 10/2003 | Walrath et al. |
| 2004/0134537 | A1 | | 7/2004 | Noll et al. |
| 2006/0185731 | A1 | | 8/2006 | Grable et al. |

* cited by examiner

*Primary Examiner* — Kevin Lee
(74) *Attorney, Agent, or Firm* — The Webb Law Firm

(57) ABSTRACT

An adapter for use in association with upstream and downstream portions of a piping system is disclosed. The adapter includes a first chamber having an inlet adapted to receive fluid therethrough, an outlet adapted to expel fluid therefrom, and a sidewall extending therebetween defining a first chamber interior. The adapter also includes a second chamber having an inlet adapted to receive forced fluid therethrough, an outlet adapted to expel the forced fluid therefrom, and a sidewall extending therebetween defining a second chamber interior. The first chamber interior is isolated from the second chamber interior. The first chamber is adapted to receive forced fluid therethrough from an upstream portion of a piping system, and the second chamber is adapted to provide forced fluid therethrough to a downstream portion of the piping system.

16 Claims, 8 Drawing Sheets

DUAL CHAMBER ADAPTER

CROSS REFERENCE TO RELATED APPLICATIONS

This patent application is a divisional application of U.S. patent application Ser. No. 11/937,059 filed Nov. 8, 2007, now U.S. Pat. No. 7,905,250 and published as United States Patent Publication No. 2008/0295907, entitled "Dual Chamber Adapter", which claims priority to U.S. Provisional Application Ser. No. 60/858,026 filed Nov. 9, 2006, the entire disclosures of both applications are herein incorporated by reference.

BACKGROUND OF THE INVENTION

1. Field of the Invention

The present invention relates to adapters for use with piping systems having a valve assembly and, more particularly, to an adapter for temporary installation within the piping system in place of the valve assembly.

2. Description of Related Art

Many piping assemblies include fluid valves, such as check valves, for regulating the flow of fluid therethrough in a single direction. A check valve typically includes a main body, having two ends, that forms an internal flow cavity that fluidly connects the two ends and houses an internal valve. In a typical installation, one end of the main body is connected to a fluid inlet pipe and the other end is connected to a fluid outlet pipe. Fluid flows from the fluid inlet pipe, through the internal flow cavity, is stopped, directed, or left unimpeded by the internal valves, and exits through the fluid outlet pipe. Such fluid valves can include backflow prevention valves, such as double check and reduced pressure principle valves.

In many commercial and residential piping assemblies, an inlet shut-off valve is positioned adjacent one end of the main body and an outlet shut-off valve is positioned adjacent the other end of the main body. Example shut-off valves are disclosed, for example, in U.S. Pat. Nos. 1,969,432; 3,245,257; 3,946,754; 4,327,760; 5,392,803; 5,511,574; and 5,732,744, the entire contents of which are herein incorporated by reference. During winterization and during other cleaning procedures, it may be desirable to flush portions of the piping and/or use pressurized gas to blow-out portions of the piping to remove excess debris and/or liquid therefrom. During winterization blow-out or flushing of the piping system, small moveable parts of fluid valves, such as check valves, can become damaged due to the high liquid or air pressure passing therethrough. Accordingly, winterization and flushing processes can damage or ruin the fluid valves.

A need therefore exists for an apparatus for use in a piping system to be flushed and/or winterized that prevents damage to fluid valves.

SUMMARY OF THE INVENTION

In an embodiment of the present invention, an adapter includes a first chamber having an inlet adapted to receive fluid therethrough, an outlet adapted to expel fluid therefrom, and a sidewall extending therebetween defining a first chamber interior. The adapter also includes a second chamber having an inlet adapted to receive forced fluid therethrough, an outlet adapted to expel the forced fluid therefrom, and a sidewall extending therebetween defining a second chamber interior. The first chamber interior is isolated from the second chamber interior. The adapter may also be configured such that the first chamber is adapted to provide forced fluid therethrough to an upstream portion of a piping system, and the second chamber is adapted to provide forced fluid therethrough to a downstream portion of the piping system.

The inlet of the first chamber may be adapted to receive liquid therethrough, and the outlet of the first chamber may be adapted to expel liquid therefrom. The inlet of the second chamber may be adapted to receive forced gas therethrough, and the outlet of the second chamber may be adapted to expel forced gas therefrom.

The outlet of the first chamber may be engageable with a liquid flush hose. Alternatively, a liquid flush hose may be disposed within the outlet of the first chamber. The inlet of the first chamber may be engageable with at least one of an upstream portion of a piping system and a shut-off valve. The liquid shut-off valve may be at least one of a globe-type valve, ball valve, gate valve, or butterfly valve.

The inlet of the second chamber may be engageable with a gas blow-out hose. Alternatively, a gas blow-out hose may be disposed within the inlet of the second chamber. The inlet of the second chamber may be connected to a source of compressed air, and the outlet of the second chamber may be engageable with at least one of a downstream portion of a piping system and a shut-off valve.

In one configuration, the sidewall of the first chamber and the sidewall of the second chamber are co-extensive. In another configuration, the adapter further includes a housing, and at least one of the sidewall of the first chamber and the sidewall of the second chamber are defined within the housing. The inlet of the first chamber and the outlet of the second chamber may be substantially aligned along a longitudinal axis of the adapter. At least one of the inlet of the first chamber and the outlet of the second chamber may include a threaded profile for matingly engaging a corresponding threaded profile of at least one of a portion of a piping system and a shut-off valve. Alternatively, at least one of the inlet of the first chamber and the outlet of the second chamber may include a pressure-fit gasket for matingly engaging a corresponding profile of at least one of a portion of a piping system and a shut-off valve. The adapter may also include a body of the adapter, and a threaded profile disposed within the body of the adapter for matingly engaging a corresponding threaded profile of at least one of a portion of a piping system and a shut-off valve.

In another embodiment of the present invention, an adapter for removable engagement with a shut-off valve within a piping system includes a first chamber and a second chamber. The first chamber includes an inlet adapted for receiving forced fluid therethrough, and an outlet adapted for fluidly engaging the shut-off valve. The second chamber includes an inlet adapted for receiving forced fluid therethrough, and an outlet adapted for gaseously engaging a portion of the piping system. Optionally, the outlet of the second chamber may be adapted for removably engaging a second shut-off valve within the piping system. The inlet of the first chamber may be adapted for receiving forced liquid therethrough, and the inlet of the second chamber may be adapted for receiving forced gas therethrough.

The second chamber may be adapted to force gas from the outlet of the second chamber through the second shut-off valve to a downstream portion of the piping system, and the inlet of the first chamber may be adapted to receive liquid from an upstream portion of the piping system.

In yet another embodiment of the present invention, a method of treating a piping system, may include the step of removably providing an adapter between an upstream portion of the piping system and a downstream portion of the piping system. The adapter may include a first chamber having an inlet adapted to receive fluid therethrough, an outlet adapted to expel fluid therefrom, and a sidewall extending therebetween defining a first chamber interior. The adapter may also include a second chamber having an inlet adapted to receive forced fluid therethrough, an outlet adapted to expel the forced fluid therefrom, and a sidewall extending therebetween defining a second chamber interior. The first chamber interior may be isolated from the second chamber interior. The method may also include the step of forcing at least one of a fluid through an upstream portion of the piping system and through the inlet of the first chamber, and a fluid through the outlet of the second chamber to a downstream portion of the piping system. Optionally, the method may further include the step of removing a removable element between the upstream portion of the piping system and the downstream portion of the piping system, prior to the step of providing the adapter between the upstream portion of the piping system and the downstream portion of the piping system.

The method may further include the step of removing the adapter and replacing the removable element.

The inlet of the first chamber may be adapted to receive liquid therethrough, the outlet of the first chamber may be adapted to expel liquid therefrom, the inlet of the second chamber may be adapted to receive forced gas therethrough, and the outlet of the second chamber may be adapted to expel forced gas therefrom.

DESCRIPTION OF THE PREFERRED EMBODIMENTS

Figure 1:
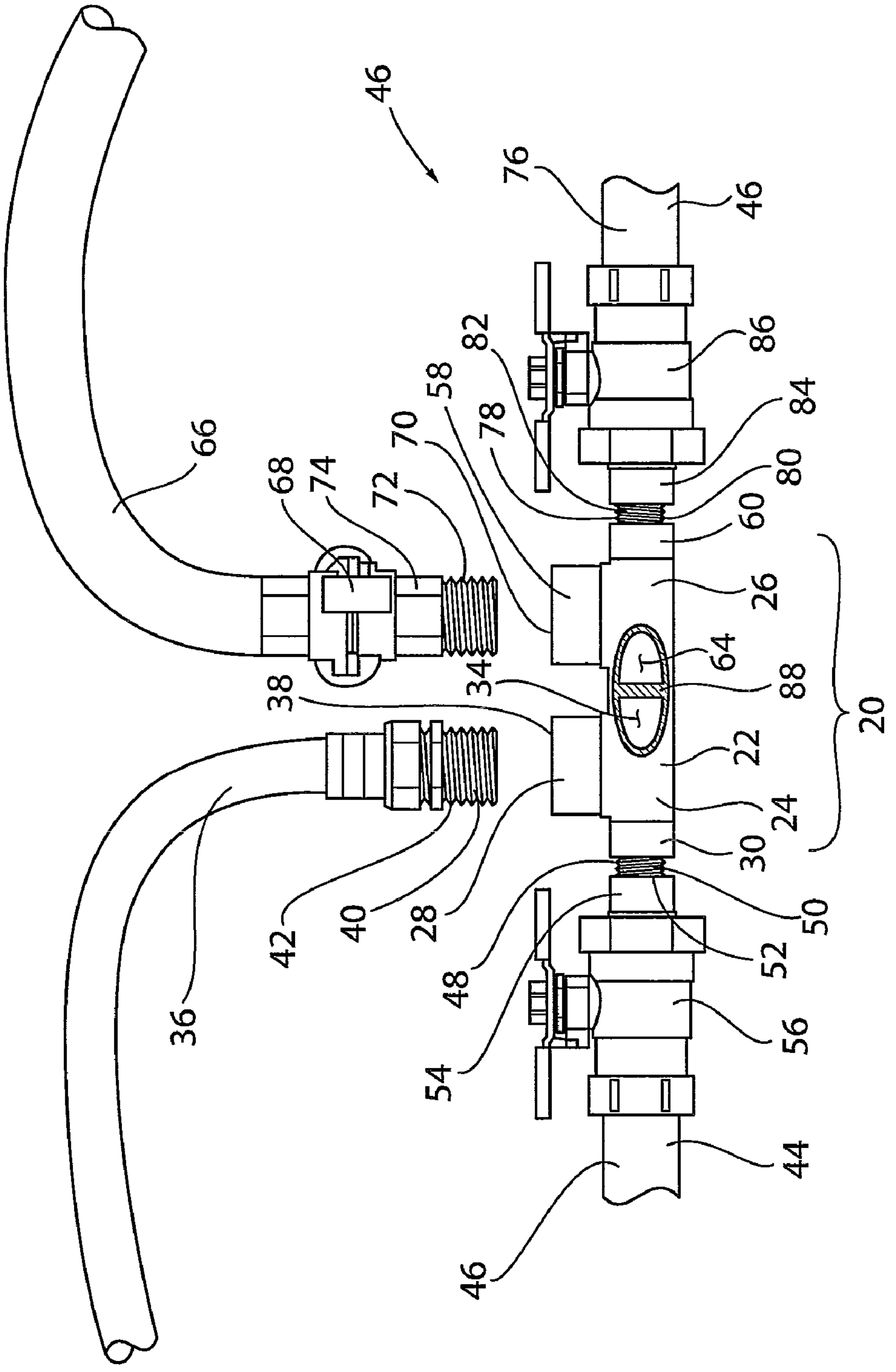
FIG. 1 is a schematic representation of a partial piping system and adapter in accordance with an embodiment of the present invention.
Figure 2:
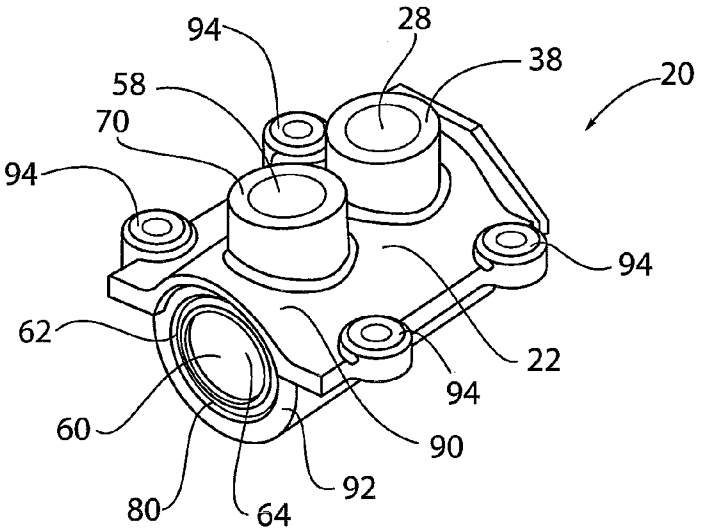
FIG. 2 is a perspective view of an adapter in accordance with an embodiment of the present invention.
Figure 3:
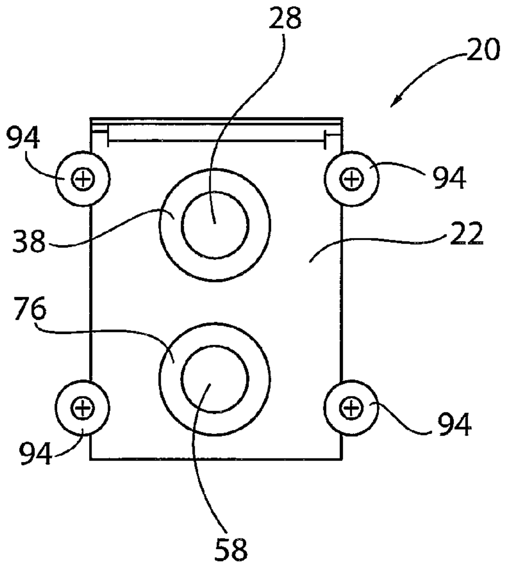
FIG. 3 is a top view of the adapter of FIG. 2.
Figure 4:
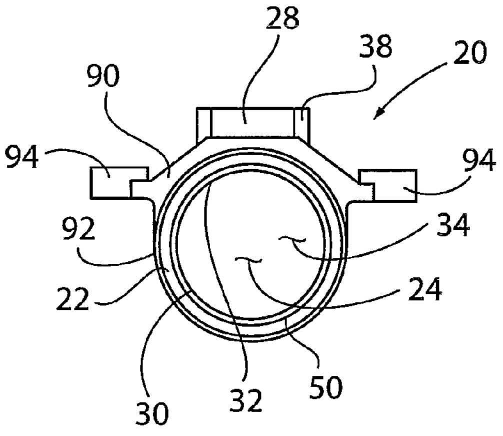
FIG. 4 is a front view of the adapter of FIG. 2.
Figure 5:
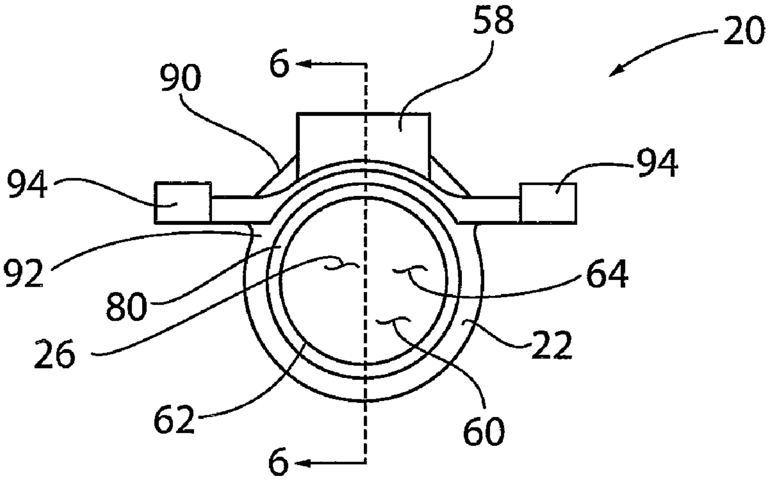
FIG. 5 is a rear view of the adapter of FIG. 2.

The adapter of the present invention can be utilized in a piping system as a temporary replacement for a fluid valve to allow the piping system to be flushed of foreign debris and/or properly winterized without damaging the fluid valve.

Referring to the drawings, in which like reference characters refer to the like parts throughout the several views thereof, FIGS. 1-6 illustrate an adapter 20 including a housing 22 having a first chamber 24 and a second chamber 26 isolated from the first chamber 24 in accordance with an embodiment of the present invention. The first chamber 24 includes an inlet 30 adapted to receive fluid, such as liquid therethrough, and an outlet 28 adapted to expel fluid, such as liquid therefrom. The first chamber 24 may include a sidewall 32 extending between the inlet 30 and the outlet 28 and defines a first chamber interior 34. As used herein the term "fluid" includes liquid(s) and/or gas(es).

The inlet 30 of the first chamber 24 is adapted to receive liquid, such as forced or pressurized liquid therethrough. In one embodiment, the liquid is pressurized water having a pressure of from about 10 psi to about 175 psi. Optionally, the liquid may be provided with additives such as disinfectants, sterilizing agents, biocides, herbicides, and other liquid conditioners such as pH modifiers. The inlet 30 may be further adapted to engage a liquid flush source such as an upstream portion 44 of piping system 46 connected to a source of liquid. In one embodiment, the piping system 46 is a residential or industrial piping system within a building or other structure, or within an outdoor industrial piping system. The upstream portion 44 of the piping system 46 can be any portion of the piping system that a user desires to flush with liquid, such as pressurized water. In one embodiment, the piping system 46, including the upstream portion 44, can include any suitable diameter piping structures and can be made of any conventional piping materials. In a further embodiment, a diameter of the inlet 30 of the first chamber 24 substantially corresponds to a diameter of the upstream portion 44 at the engagement connection 48. In one embodiment, the inlet 30 may be provided with a mating structure 50 for engaging a corresponding mating structure 52, shown in FIG. 1, disposed adjacent the connection end 54 of the piping system 46. The mating structure 50 may be a threaded profile for threadingly engaging a corresponding threaded profile of the corresponding mating structure 52. Alternatively, at least one of the mating structure 52 and the corresponding mating structure 50 is an elastomeric gasket, such as a pressure-fit gasket, and the other of the mating structure 52 and the corresponding mating structure 50 is a corresponding receiving portion for sealingly engaging the elastomeric gasket. The inlet 30 of the first chamber 24 may be adapted for temporarily engaging the connection end 54 of the upstream portion 44 of piping system 46. The inlet 30 may have any suitable dimensions for accommodating an upstream portion 44 of the piping system 46 therein. The inlet 30 is further adapted to allow liquid entering the inlet 30 to pass into the first chamber interior 34. In order to temporarily provide a connection between the upstream portion 44 of the piping system 46 and the inlet 30 of the first chamber 24, the upstream portion 44 of the piping system 46 may be provided with a shut-off valve 56 adjacent the connection end 54. The inlet 30 of the first chamber 24 may be engageable with an upstream portion 44 of the piping system 46 including a shut-off valve 56, or may be directly engageable with a portion of the shut-off valve 56. The shut-off valve 56 may be any suitable valve structure for regulating flow of liquid through the piping system 46. In one embodiment, the shut-off valve 56 may be a globe-type valve coupled with a union fitting, a ball valve, a gate valve or a butterfly valve.

The outlet 28 of the first chamber 24 is provided to expel liquid from the first chamber interior 34. As used herein, the phrase "expel liquid" refers to both actively forcing liquid from the first chamber interior 34 as well as passively allowing liquid to pass from the first chamber interior 34 by gravitational, surface tension, and/or capillary action. The outlet 28 of the first chamber 24 is also adapted for engagement with a liquid flush hose 36.

The outlet 28 of the first chamber 24 may be provided with a mating structure 38 for engaging a corresponding mating structure 40, shown in FIG. 1, disposed adjacent the connection end 42 of the liquid flush hose 36. The mating structure 38 may be a threaded profile for threadingly engaging a corresponding threaded profile of the corresponding mating structure 40. Alternatively, at least one of the mating structure 38 and the corresponding mating structure 40 is an elastomeric gasket, such as a pressure-fit gasket, and the other of the mating structure 38 and the corresponding mating structure 40 is a corresponding receiving portion for sealingly engaging the elastomeric gasket. The outlet 28 of the first chamber 24 may be adapted for temporarily engaging the connection end 42 of the liquid flush hose 36 to form a substantially liquid impervious seal therewith. Alternatively, the connection end 42 of liquid flush hose 36 may be permanently disposed within the outlet 28. The liquid flush hose 36 may be provided with a value mechanism (not shown) for temporarily restraining liquid therethrough, as is conventionally known. The outlet 28 may have any suitable dimensions for accommodating the connection end 42 of the liquid flush hose 36 to allow liquid, such as forced liquid, therethrough to a removal source or drain (not shown).

Referring again to FIGS. 1-6, the housing 22 further includes a second chamber 26 having an inlet 58 adapted to receive forced or pressurized fluid, such as gas therethrough, and an outlet 60 adapted to expel the forced fluid or pressurized gas therefrom. The second chamber 26 may include a sidewall 62 extending between the inlet 58 and the outlet 60 and defining a second chamber interior 64. The inlet 58 of the second chamber 26 is adapted to receive forced or pressurized gas, such as pressurized air, therethrough. The inlet 58 may be adapted for connection with a source of compressed air. In one embodiment, the gas is pressurized air having a pressure of from about 50 psi to about 175 psi. Optionally, gaseous additives may be provided in the forced or pressurized gas such as disinfectants, sterilizing agents, biocides, herbicides, and other conditioners such as pH modifiers. The inlet 58 may be further adapted to engage a gas blow-out hose 66 connected to a source of forced gas. The gas blow-out hose 66 may be provided with a valve mechanism 68 for temporarily restraining the gas therethrough, as is conventionally known. In one embodiment, the inlet 58 may be provided with a mating structure 70 for engaging a corresponding mating structure 72, shown in FIG. 1, disposed adjacent the connection end 74 of the gas blow-out hose 66. The mating structure 70 may be a threaded profile for threadingly engaging a corresponding threaded profile of the corresponding mating structure 72. Alternatively, at least one of the mating structure 70 and the corresponding mating structure 72 is an elastomeric gasket, and the other of the mating structure 70 and the corresponding mating structure 72 is a corresponding receiving portion for sealingly engaging the elastomeric gasket.

The inlet 58 of the second chamber 26 may be adapted for temporarily engaging the connection end 74 of the gas blow-out hose 66. Alternatively, the connection end 74 of the gas blow-out hose 66 may be permanently disposed within the inlet 58 of the second chamber 26. The inlet 58 may have any suitable dimensions for accommodating a gas blow-out hose 66. The inlet 58 is further adapted to allow forced gas entering the inlet 58 to pass into the second chamber interior 64. In one embodiment, the second chamber interior 64 may have substantially the same interior volume as the first chamber interior 34. In yet another embodiment, the second chamber interior 64 may have an interior volume that is different than the interior volume of the first chamber interior 34.

The outlet 60 of the second chamber 26 is provided to expel forced gas from the second chamber interior 64. As used herein, the phrase "expel forced gas" refers to both actively forcing gas from the first chamber interior 34 as well as passively allowing gas having previously generated pressure to pass from the second chamber interior 64. The outlet 60 of the second chamber 26 is also adapted for engagement with a second portion, such as a downstream portion 76 of the piping system 46. The downstream portion 76 of the piping system 46 can be any portion of the piping system that a user desires to blow out with gas, such as compressed air, and the second chamber 26 is adapted to provide forced gas therethrough to a downstream portion 76 of the piping system 46. In one embodiment, the piping system 46, including the downstream portion 76, can include any suitable diameter piping structures and can be made of any conventional piping materials. In a further embodiment, a diameter of the outlet 58 of the second chamber 26 substantially corresponds to a diameter of the downstream portion 76 at the engagement connection 78.

The outlet 60 of the second chamber 26 may be provided with a mating structure 80 for engaging a corresponding mating structure 82, shown in FIG. 1, disposed adjacent the engagement connection 78 of the downstream portion 76. The mating structure 80 may be a threaded profile for threadingly engaging a corresponding threaded profile of the corresponding mating structure 82. Alternatively, at least one of the mating structure 80 and the corresponding mating structure 82 is an elastomeric gasket, and the other of the mating structure 80 and the corresponding mating structure 82 is a corresponding receiving portion for sealingly engaging the elastomeric gasket. The outlet 60 of the second chamber 26 is adapted for temporarily engaging the connection end 84 of the downstream portion 76 to form a substantially gaseous impervious seal therewith. The outlet 60 may have any suitable dimensions for accommodating the connection end 84 of the downstream portion 76 to provide forced gas, such as compressed air, therethrough to a downstream portion 76 of the piping system 46.

In order to temporarily provide a connection between the downstream portion 76 of the piping system 46 and the outlet 60 of the second chamber 26, the downstream portion 76 of the piping system 46 may be provided with a shut-off valve 86 adjacent the connection end 84. The outlet 60 of the second chamber 26 may be engageable with a downstream portion 76 of the piping system 46 including a shut-off valve 86, or may be directly engageable with a portion of the shut-off valve 86. The shut-off valve 86 may be any suitable valve structure for regulating flow of gas and liquid through the piping system 46, as will be discussed herein. In one embodiment, the shut-off valve 86 may be a globe-type valve coupled with a union fitting, a ball valve, a gate valve, or a butterfly valve.

Referring yet again to FIGS. 1-6, the first chamber interior 34 is isolated from the second chamber interior 64, such that liquid passing through the first chamber 24 cannot mix with gas passing through the second chamber 26. In one embodiment, the sidewall 32 of the first chamber 24 and the sidewall 62 of the second chamber 26 are separately formed and subsequently assembled within the housing 22 of the adapter 20 of the present invention. In another embodiment, the sidewall 32 of the first chamber 24 and the sidewall 62 of the second chamber 26 are formed within the housing 22, such as coformed therewith. In yet a further embodiment, the housing 22 defines the first chamber interior 34 in a first portion and defines the second chamber interior 64 in a second portion separate from the first portion. The sidewall 32 of the first chamber 24 may be co-extensive with the sidewall 62 of the second chamber 26. In a further embodiment, the first chamber 24 is isolated from the second chamber 26 by a barrier 88 which may be separately formed and subsequently assembled, or co-formed between the first chamber 24 and the second chamber 26. In one embodiment, the housing 22 is made from a metal or polymeric composition and the barrier 88 is integrally formed therewith, such as during the casting process. The barrier 88 may have any suitable dimensions sufficient to isolate the first chamber 24 from the second chamber 26. In one embodiment, the barrier 88 may be made of a metal and/or polymeric composition.

Figure 6:
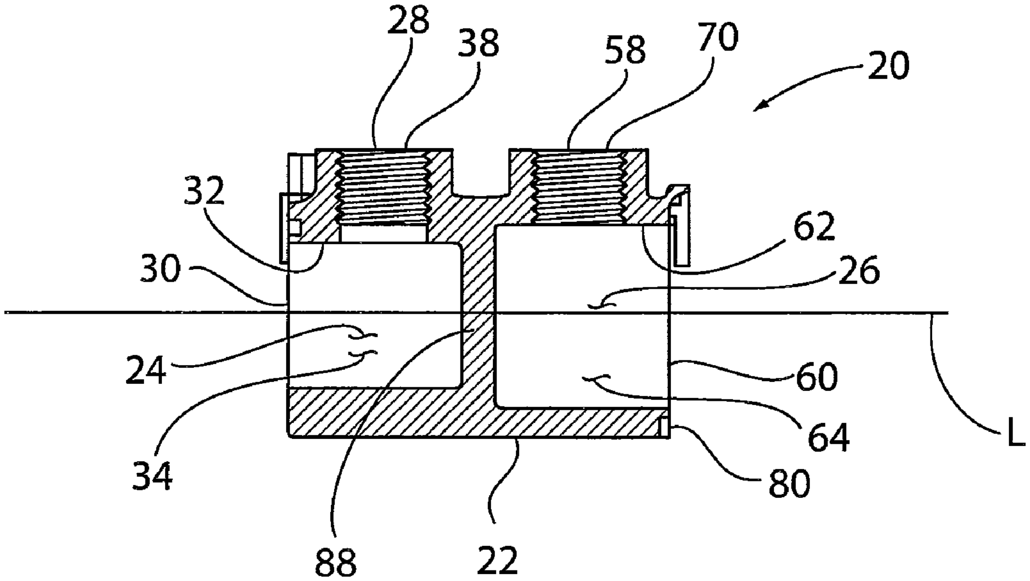
FIG. 6 is a cross-sectional side view of the adapter of FIG. 2 taken along line 6-6 of FIG. 5.
Figure 7:
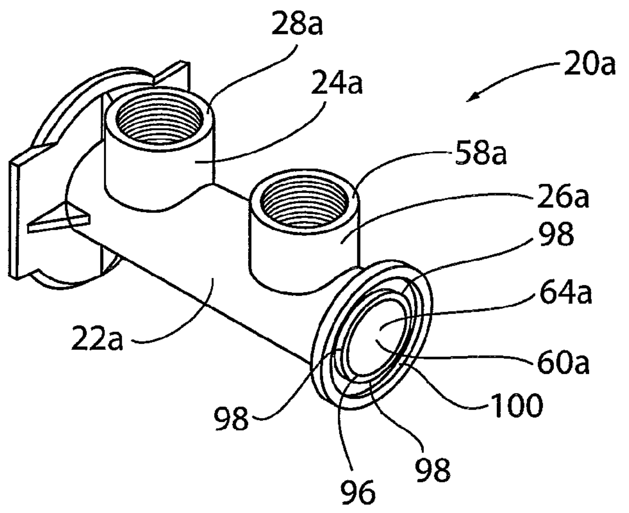
FIG. 7 is a perspective view of an alternative adapter in accordance with an embodiment of the present invention.
Figure 8:
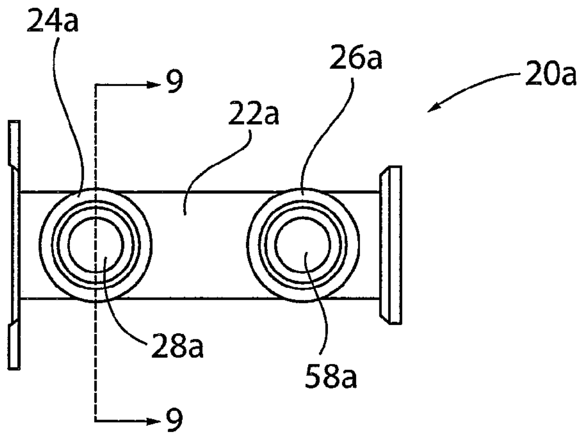
FIG. 8 is a top view of the adapter of FIG. 7.
Figure 9:
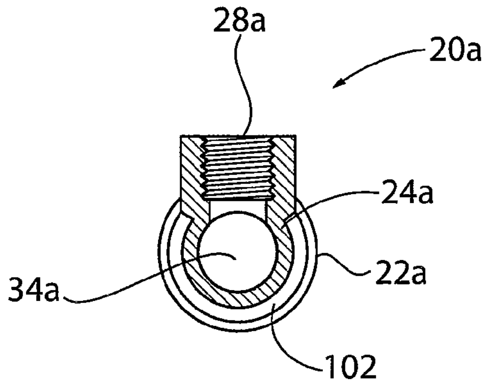
FIG. 9 is a cross-sectional view of the adapter of FIG. 7 taken along line 9-9 of FIG. 8.
Figure 10:
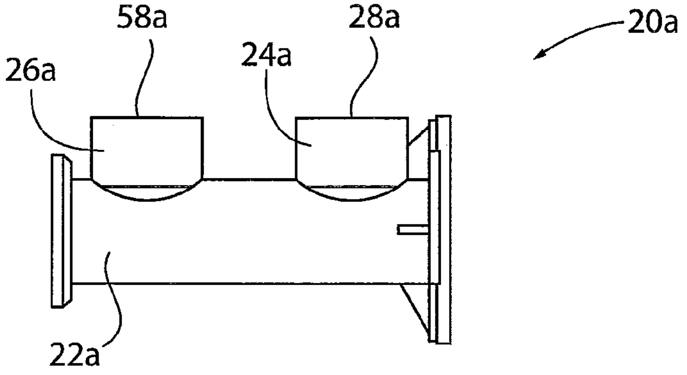
FIG. 10 is a side view of the adapter of FIG. 7.
Figure 11:
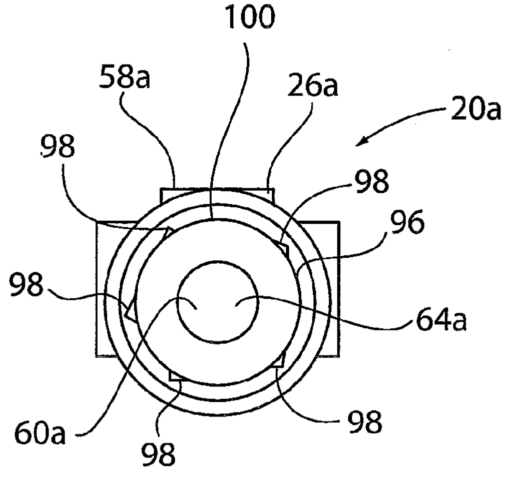
FIG. 11 is a front view of the adapter of FIG. 7.
Figure 12:
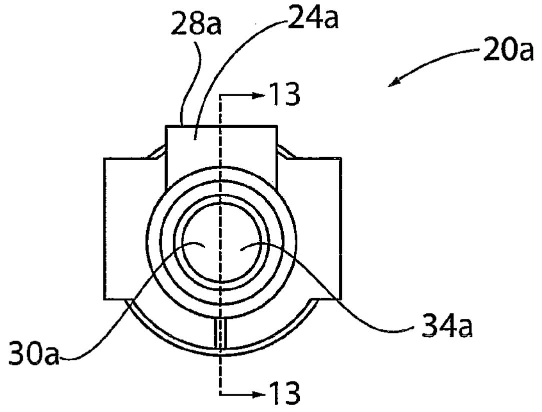
FIG. 12 is a rear view of the adapter of FIG. 7.

The first chamber 24 and the second chamber 26 may have any orientation within the housing 22 such that the outlet 28 of the first chamber 24 is engageable with a liquid flush hose 36, the inlet 30 of the first chamber 24 is engageable with an upstream portion 44 of a piping system 46, the inlet 58 of the second chamber 26 is engageable with a gas blow-out hose 66, and the outlet 60 of the second chamber 26 is engageable with a downstream portion 76 of the piping system 46. In one embodiment, the inlet 30 of the first chamber 24 and the outlet 60 of the second chamber 26 are substantially aligned along a longitudinal axis L of the adapter 20, as shown in FIG. 6.

Referring again to FIGS. 1-6, the adapter 20 may be formed in several mating sections, such as a first mating section 90 and a second mating section 92, shown in FIG. 2, that may be fastened together by a fastener 94 or plurality of fasteners 94, such as rivets, nuts, bolts, and the like.

Figure 13:
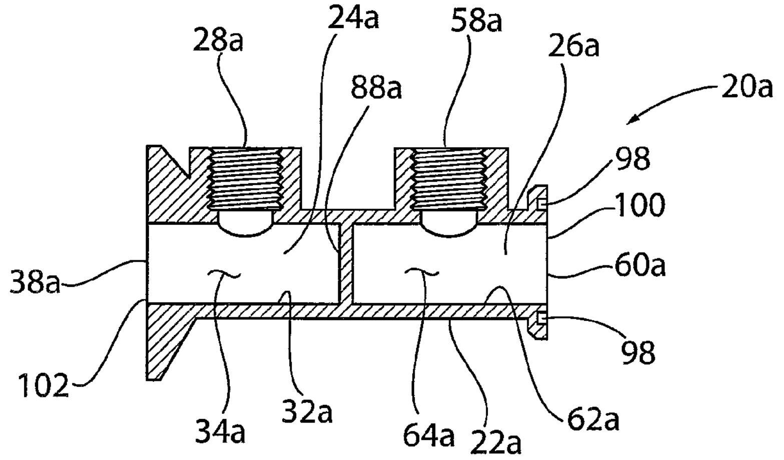
FIG. 13 is a cross-sectional side view of the adapter of FIG. 7 taken along line 13-13 of FIG. 12.
Figure 15:
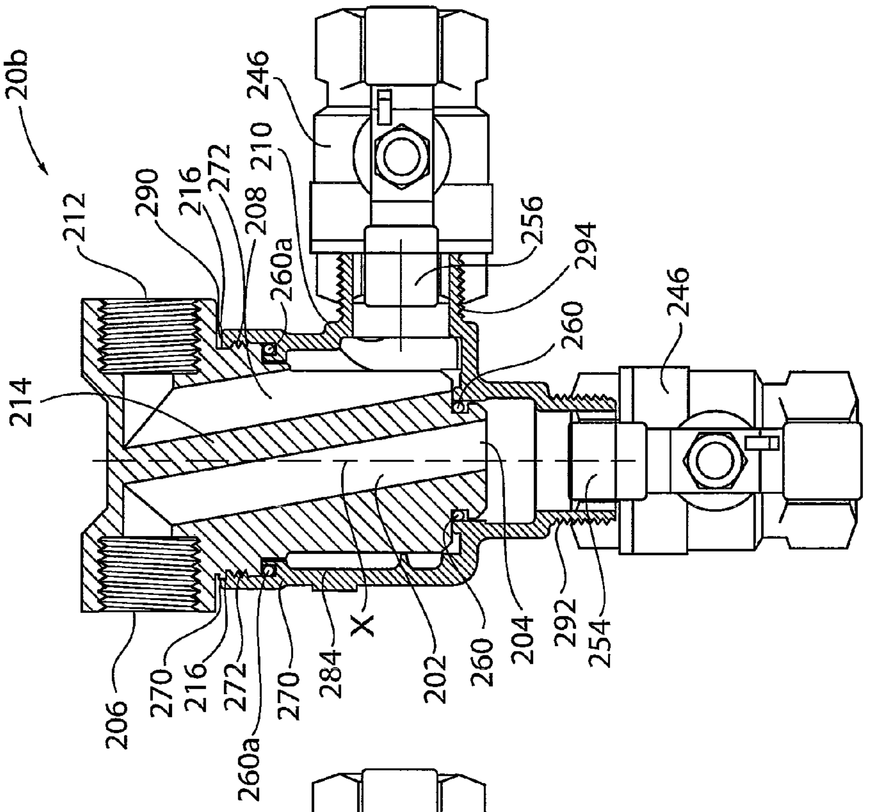
FIG. 15 is a cross-sectional view of an alternative adapter in accordance with an embodiment of the present invention.

Referring to FIGS. 7-13, in an alternative embodiment, the adapter 20*a* includes a first chamber 24*a* having an outlet 28*a*, an inlet 30*a*, a sidewall 32*a* extending therebetween and defining a first chamber interior 34*a*. The adapter 20*a* also includes a second chamber 26*a* having an inlet 58*a*, an outlet 60*a*, a sidewall 62*a* extending therebetween and defining a second chamber interior 64*a*. The adapter 20*a* further including a housing 22*a*, with the first chamber interior 34*a* isolated from the second chamber interior 64*a* by a barrier 88*a* formed therebetween, as shown in FIG. 13.

As shown in FIGS. 7-13, the housing 22*a* of the adapter 20*a* of the present invention may have an engagement profile 96 for slidingly engaging a connection end 54 of an upstream portion 44 of the piping system 46, shown in FIG. 1, adjacent the outlet 28*a* of the first chamber 24*a*. Alternatively, the engagement profile 96 may be provided for slidingly engaging a portion of the shut-off valve 56, also shown in FIG. 1. The engagement profile 96 may be provided to engage at least one of the connection end 54 or a portion of the shut-off valve 56 without necessitating the use of additional fasteners. In one embodiment, engagement mechanisms 98 may be fainted integrally to the engagement profile 96 for securing the outlet 28*a* with either the connection end 54 or a portion of the shut-off valve 56. In one embodiment, the engagement mechanisms 98 may be provided spaced along the perimeter 100 of the outlet 28*a*. In another embodiment, a single engagement mechanism 98 may be provided at a specified location of the outlet 28*a*. The engagement mechanisms 98 may be protrusions, such as angled barbs, extending beyond the perimeter 100 of the outlet 28*a*. Alternatively, the engagement mechanisms 98 may be recessed portions having an engaging portion therein, positioned within the perimeter 100 of the outlet 28*a*.

Referring again to FIGS. 7-13, the housing 22*a* may also include an engagement profile 102, as described above with reference to profile 96, for slidingly engaging a connection end 84 of a downstream portion 76 of the piping system 46, shown in FIG. 1, adjacent the outlet 60*a* of the second chamber 26*a*. Alternatively, the engagement profile 102 may be provided for slidingly engaging a portion of the shut-off valve 86, also shown in FIG. 1. In another embodiment, the housing 22*a* is adapted to include a slanted profile. In one embodiment, the slanted profile of the housing 22*a* may correspond to the profile of a device, such as a check valve, removed from the piping system 46 and replaced by the adapter 20*a*. Accordingly, the slanted profile may assist in the engagement of the adapter 20*a* within the piping system 46 without the use of additional fasteners. In another embodiment, the housing 22*a* may have any suitable exterior profile for corresponding to the piping system 46 to form a substantially liquid impermeable seal therewith.

Figure 14:
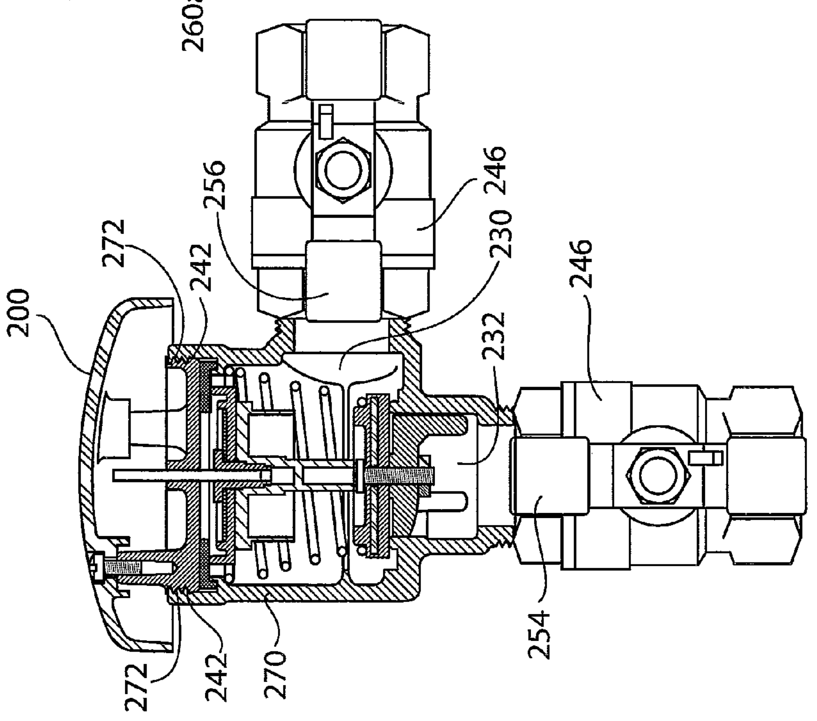
FIG. 14 is a cross-sectional view of an exemplary check valve that is replaceable with an adapter of the present invention.
Figure 16:
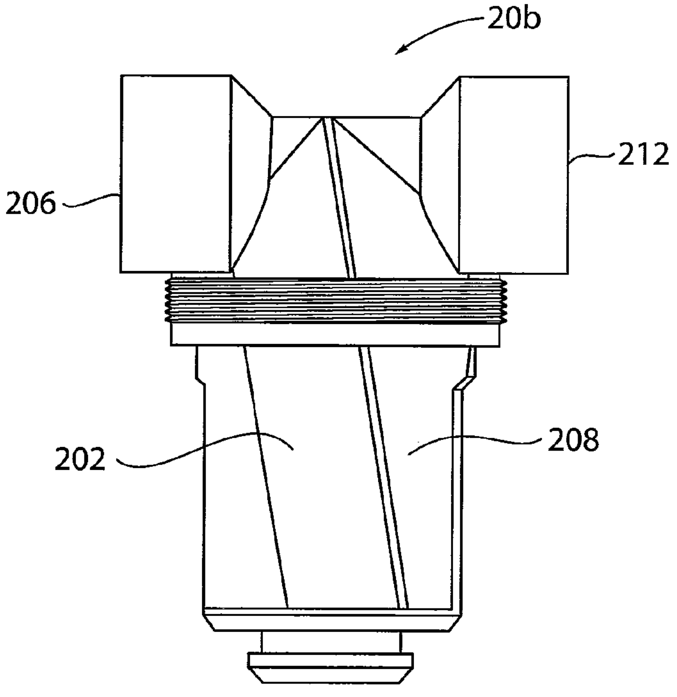
FIG. 16 is a front view of the adapter of FIG. 15.
Figure 17:
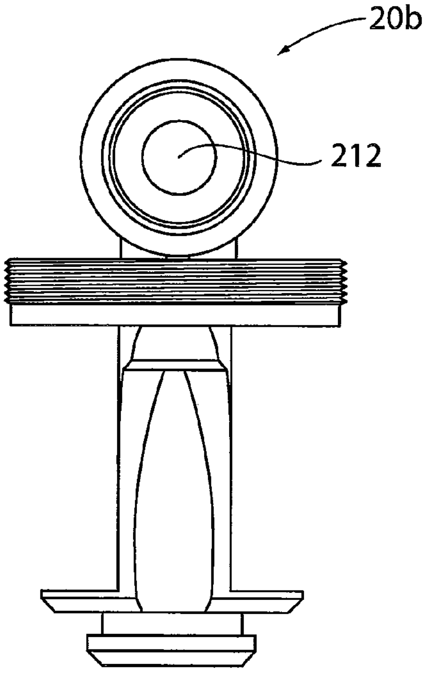
FIG. 17 is a side view of the adapter of FIG. 15.
Figure 18:
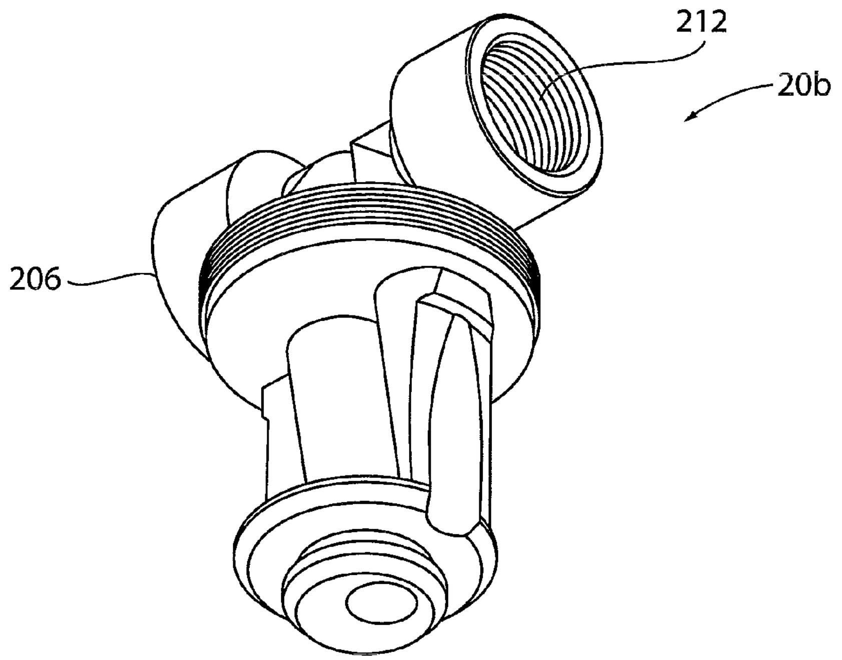
FIG. 18 is a bottom perspective view of the adapter of FIG. 15.

As shown in FIG. 14, a check valve 200 may be initially disposed within an integral housing 270 disposed between an upstream portion 254 of the piping system 246 and a downstream portion 256 of the piping system 246. The check valve 200 may be engaged within the integral housing 270 such that liquid may pass from the upstream portion 254 of the piping system 246 through the inlet 232 of the check valve 200, through the outlet 230 of the check valve 200, and through the downstream portion 256 of the piping system 246 when the check valve 200 permits flow therethrough. The internal housing 270 may include an engagement profile 272, such as an internal threaded profile, for matingly engaging a corresponding engagement profile 242, such as a threaded profile, of the check valve 200. Alternatively, the engagement profile 272 of the internal housing 270 may include a pressure-fit gasket for matingly engaging a corresponding engagement profile 242 of the check valve 200. When it is desirable to flush or blow out a portion of the piping system 246, the check valve 200, or other similarly structured device as described herein, is removed and an adapter 20*b* as shown in FIGS. 15-18 may be disposed within the piping system 246 in place of the check valve 200.

As shown in FIGS. 15-18, an adapter 20*b* may be inserted into the integral housing 270 and aligned with the downstream portion 256 of the piping system 246 and the upstream portion 254 of the piping system 246. In this embodiment, the adapter 20*b* may include a first chamber 202 having an inlet 204 adapted to receive fluid therethrough, such as forced or pressurized liquid, and an outlet 206 adapted to expel fluid therefrom. The adapter 20*b* may also include a second chamber 208 having an inlet 212 adapted to receive fluid therethrough, such as pressurized gas, and an outlet 210 adapted to expel fluid therefrom. In this embodiment, the first chamber 202 and the second chamber 208 may be separated by a barrier 214. In another embodiment, the first chamber 202 and the second chamber 208 may be offset from one another by an angle, such as along the longitudinal axis X of the adapter 20*b*. In a further embodiment, the adapter 20*b* may include a corresponding engagement profile 216 for engaging the engagement profile 272 of the internal housing 270.

In one embodiment, the engagement profile 272 of the internal housing 270 is located within the body 284 of the internal housing 270 and spaced apart from the receiving port 290 adapted to receive the check valve 200, adapter 20*b*, or similar device therethrough. In another embodiment, the engagement profile 272 of the internal housing 270 is located within the body 284 of the internal housing 270 and is spaced apart from the connection port 292 to the upstream portion 254 of the piping system 246. In another embodiment, the engagement profile 272 of the internal housing 270 is located within the body 284 of the internal housing 270 and is spaced apart from the connection portion 294 to the downstream portion 256 of the piping system 246.

Referring again to FIG. 15, in one embodiment, the adapter **20*b* includes a gasket 260, such as an O-ring, adjacent the exterior of the body 284 to engage a portion of the piping system 246. In one embodiment, the gasket 260 enhances the sealing engagement of the adapter 20*b* with the piping system 246. In another embodiment, the gasket 260 may provide separation of the first chamber 202 and the second chamber 208. In a further embodiment, a second gasket 260*a* may be provided for engaging a portion of the piping system, such that a first gasket 260 may engage a first portion of the piping system 246 and the second gasket 260*a* may engage a second portion of the piping system 246**.

Referring yet again to FIG. 15, in one embodiment a gasket 260 is provided to engage the upstream portion 254 of the piping system 246 and the second gasket **260*a* is provided to engage the downstream portion 256 of the piping system 246. The gasket(s) 260, 260*a* may also provide separation between the first chamber 202 and the second chamber 208. In a further embodiment, the adapter 20*b* may be threaded into the internal housing 270. As the adapter 20*b* may be provided in threaded engagement, the final orientation within the internal housing 270 may vary. Accordingly, it may be advantageous that the first chamber 202 and/or the second chamber 208 are not attached to the upstream portion 254 and/or the downstream portion 256 of the piping system 246. Instead, the first chamber 202 and/or the second chamber 208 may be alignable with the upstream portion 254 and/or the downstream portion 256 and a separate gasket 260, 260*a*** may be provided for sealing engagement therewith.

Figure 19:
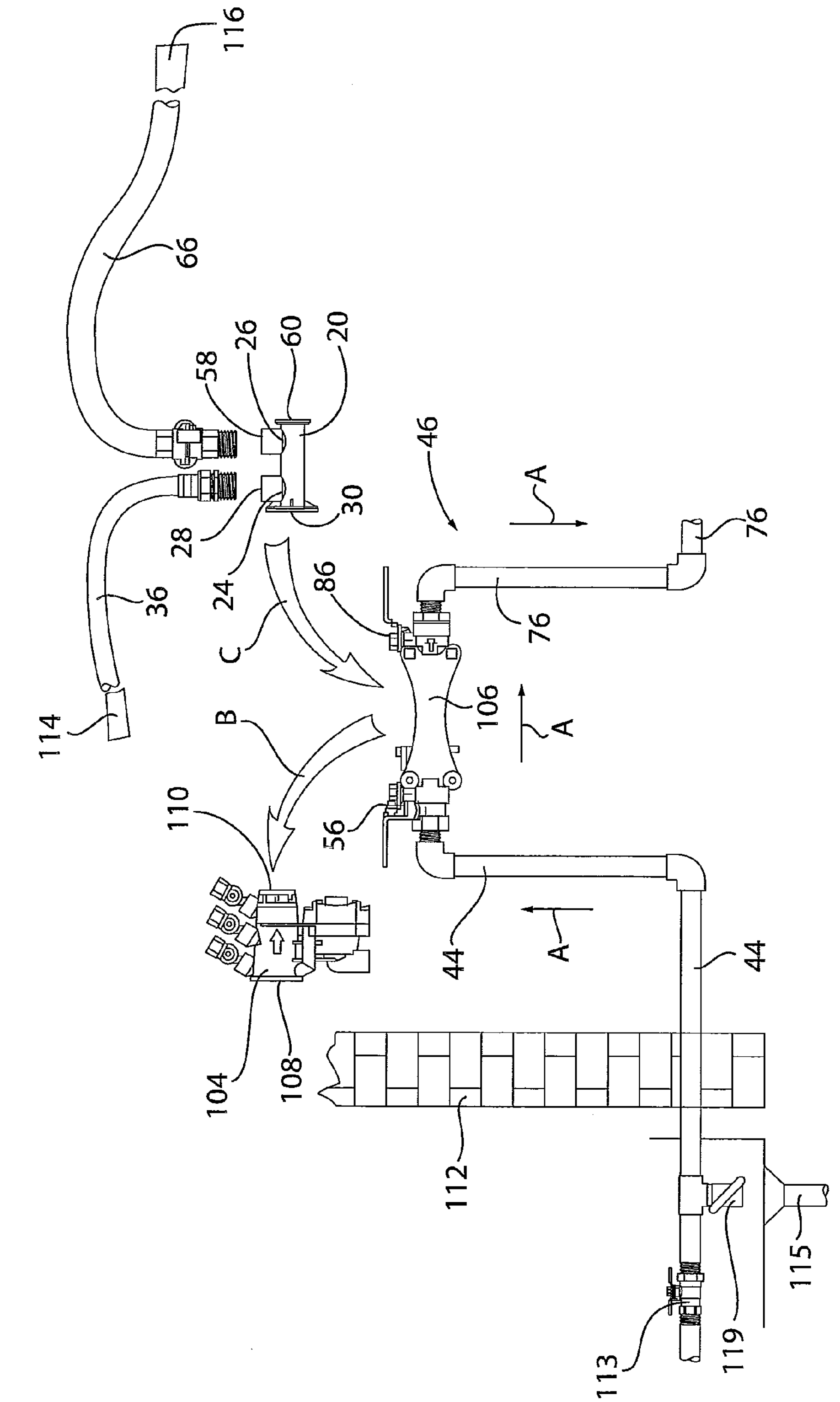
FIG. 19 is a schematic representation of a partial piping system and adapter in accordance with an embodiment of the present invention.

A conventional piping system 46, such as a system internal and/or external to a building 112, for receiving the adapter 20, as well as **20*a* and 20*b* described above, of the present invention therein is shown in FIG. 19. In this configuration a device 104 such as, for example, a backflow prevention device or water meter, having union fitting ends, is received and attached between shut-off valves 56, 86. Optionally, the device 104 may be provided within a housing 106 structured to align an inlet 108 of the device 104 with shut-off valve 56 and the outlet 110 of the device 104 with shut-off valve 86. In one embodiment, the device is, or includes, an operational fluid valve such as a check valve, double check valve, and/or a reduced pressure valve. Example double check valves are disclosed in U.S. Patent Publication No. 2004/0134537, the entire contents of which are herein incorporated by reference, and include a Double Check Valve Assembly Model No. 350 commercially available from Zurn Industries, Inc. Example reduced pressure valves include the Reduced Pressure Principle Assembly Model No. 375, commercially available from Zurn Industries, Inc. Examples of alternative devices 104 suitable for use in the piping system 46** described herein are disclosed in U.S. Patent Publication Nos. 2006/0185731 and 2004/0134537 and U.S. Pat. Nos. 6,513,543 and 5,913,331, the entire contents of each of which is herein incorporated by reference.

During normal operation, water or other fluid will pass through the device 104 and shut-off valves 56, 86, which are in the open position, through the piping system 46 in the direction shown by arrows A. However, if the piping system 46 must be flushed of debris, winterized, dried or otherwise treated, then the shut-off valves 56, 86 may be closed, the device 104 removed to prevent damage thereto. Often moving parts within the device 104, such as valve components, may be damaged during flushing and/or winterizing procedures. Once the device 104 is removed, as shown by arrow B, the adapter 20 of the present invention may be removably engaged within the piping system in place of the device 104, shown by arrow C. In one embodiment, the inlet 30 of the first chamber 24 of the adapter 20 is removably engaged with the shut-off valve 56. In another embodiment, the outlet 60 of the second chamber 26 of the adapter is removably engaged with the shut-off valve 86. In a further embodiment, the adapter 20 may be aligned within the housing 106 and engaged with the shut-off valves 56, 86 as described herein.

The inlet 30 of the first chamber 24 may be fluidly engaged with the shut-off valve 56. As used herein, the term "fluidly engaged" includes configurations in which the inlet 30 is adapted to provide fluid therethrough from the shut-off valve 56 connected to the upstream portion 44 of the piping system 46. The term "fluidly engaged" also includes configurations in which the inlet 30 is directly connected to a portion of the shut-off valve 56, and configurations in which the inlet 30 is connected to a section of piping which is connected to a portion of the shut-off valve 56. The outlet 60 of the second chamber 26 may be gaseously engaged with the shut-off valve 86. As used herein, the term "gaseously engaged" includes configurations in which the outlet 60 is adapted to provide forced gas therethrough to the shut-off valve 86. The term "gaseously engaged" also includes configurations in which the outlet 60 is directly connected to a portion of the shut-off valve 86, and configurations in which the outlet 60 is connected to a section of piping which is connected to a portion of the shut-off valve 86.

When an upstream portion 44 of the piping system 46 is to be flushed with fluid, such as pressurized water, the outlet 28 of the first chamber 24 may be coupled to a liquid flush hose 36 and pressurized liquid may be flushed from a source of pressurized liquid 113, through the upstream portion 44, through the open shut-off valve 56, and through the first chamber 24 in a direction shown by arrow A. After exiting the first chamber 24, the flush liquid may be directed through the liquid flush hose 36 to a waste collection receptacle 114, such as a drain, to collect the waste flush liquid. Once the upstream piping 44 has been flushed, the shut-off valve 56 may be closed, and the liquid flush hose 36 may be removed.

Similarly, if a downstream portion 76 of the piping system 46 must be winterized, then the inlet 58 of the second chamber 26 may be coupled to a gas blow-out hose 66 and forced gas may be directed from a source of pressurized gas 116, through the gas blow-out hose 66 and second chamber 26 through the open shut-off valve 86 and through the downstream portion 76 of piping system 46 in a direction counter to the direction shown by arrow A. Once the downstream portion 76 is substantially free of liquid, the shut-off valve 86 may be closed and the gas blow-out hose 66 may be removed.

In a further embodiment, pressurized liquid may be passed through the first chamber 24 and upstream piping section 44 at the same time that forced gas may be passed through the second chamber 26 and downstream portion 76. After the upstream portion 44 and/or downstream portion 76 have been winterized and/or flushed, the adapter 20 may be removed from the piping system 46 and the device 104 may be replaced between the shut-off valves 56, 86.

In a further embodiment, the upstream portion 44 of the piping system 46 may be winterized or blown-out by sealing a valve adjacent the source of pressurized liquid 113 and opening a valve 119 adjacent a drain 115 thereby allowing liquid within the upstream portion 44 to exit the drain 115 via gravitational flow. Alternatively, pressurized gas may be directed through the first chamber 24, through upstream portion 44, and out valve 119 in a direction counter to the direction of arrow A in a process similarly described above.

Referring again to FIGS. 1-18, the adapter 20, 20*a*, 20*b* may replace a removable element such as a piping section, a valve, such as a check valve, or a regulator body, such as a backflow prevention device or a pressure reducing valve disposed between shut-off valves 56, 86. In one embodiment, the check valve may be a 300-series backflow prevention device, such as commercially available from Zurn Industries, Inc. In operation, the piping section or valve is removed and the adapter 20 of the present invention is inserted within the piping system 46 (shown in FIG. 19) in place of the piping section or valve. The piping system 46, or a portion of the piping system 46, may be flushed with gas and/or liquid, the adapter 20 may be removed from the piping system 46, and the piping section or valve is replaced.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A method of treating a piping system, comprising:

removably providing an adapter between an upstream portion of the piping system and a downstream portion of the piping system, the adapter comprising:

a first chamber having an inlet adapted to receive fluid therethrough, an outlet adapted to expel fluid therefrom, and a sidewall extending therebetween defining a first chamber interior; and a second chamber having an inlet adapted to receive forced fluid therethrough, an outlet adapted to expel the forced fluid therefrom, and a sidewall extending therebetween defining a second chamber interior, wherein the first chamber interior is isolated from the second chamber interior; and forcing at least one of fluid through an upstream portion of the piping system and through the inlet of the first chamber, and fluid through the outlet of the second chamber to a downstream portion of the piping system.

2. The method of claim 1, further comprising removing a removable element between the upstream portion of the piping system and the downstream portion of the piping system, prior to the step of providing the adapter between the upstream portion of the piping system and the downstream portion of the piping system.

3. The method of claim 2, further comprising removing the adapter and replacing the removable element.

4. The method of claim 2, wherein the inlet of the first chamber is adapted to receive liquid therethrough, the outlet of the first chamber is adapted to expel liquid therefrom, the inlet of the second chamber is adapted to receive forced gas therethrough, and the outlet of the second chamber is adapted to expel forced gas therefrom.

5. The method of claim 1, wherein the adapter is configured to be received by a housing used to form a portion of a back flow prevention device.

6. A method of treating a piping system, comprising:

providing an adapter between an upstream portion of the piping system and a downstream portion of the piping system, the adapter comprising:

a first chamber having an inlet adapted to receive fluid therethrough, an outlet adapted to expel fluid therefrom, and a sidewall extending therebetween defining a first chamber interior, wherein the inlet of the first chamber is provided in fluid engagement with an upstream portion of the piping system, such that liquid may pass therethrough through the upstream portion of the piping system; and a second chamber having an inlet adapted to receive forced fluid therethrough, an outlet adapted to expel the forced fluid therefrom, and a sidewall extending therebetween defining a second chamber interior, wherein the outlet of the second chamber is gaseously engaged with a downstream portion of the piping system, wherein the first chamber interior is isolated from the second chamber interior; and forcing at least one of fluid through an upstream portion of the piping system and through the inlet of the first chamber, and fluid through the outlet of the second chamber to a downstream portion of the piping system, wherein the upstream portion of the piping system is isolated from the downstream portion of the piping system.

7. The method of claim 6, further comprising removing a removable element between the upstream portion of the piping system and the downstream portion of the piping system, prior to the step of providing the adapter between the upstream portion of the piping system and the downstream portion of the piping system.

8. The method of claim 7, further comprising removing the adapter and replacing the removable element.

9. The method of claim 6, wherein the inlet of the first chamber is adapted to receive liquid therethrough, the outlet of the first chamber is adapted to expel liquid therefrom, the inlet of the second chamber is adapted to receive forced gas therethrough, and the outlet of the second chamber is adapted to expel forced gas therefrom.

10. The method of claim 6, wherein the adapter is configured to be received by a housing used to form a portion of a back flow prevention device.

11. A method of treating a piping system, comprising:

providing an adapter between an upstream portion of the piping system and a downstream portion of the piping system, the adapter comprising:

a first chamber having an inlet adapted for receiving forced liquid therethrough and an outlet adapted for fluidly engaging the shut-off valve, wherein the inlet of the first chamber is fluidly engaged with an upstream portion of the piping system; and a second chamber having an inlet adapted for receiving forced gas therethrough and an outlet adapted for gaseously engaging a portion of the piping system, wherein the outlet of the second chamber is gaseously engaged with a downstream portion of the piping system; and forcing at least one of fluid through an upstream portion of the piping system and through the inlet of the first chamber, and fluid through the outlet of the second chamber to a downstream portion of the piping system.

12. The method of claim 11, wherein the upstream portion of the piping system is isolated from the downstream portion of the piping system.

13. The method of claim 11, further comprising removing a removable element between the upstream portion of the piping system and the downstream portion of the piping system, prior to the step of providing the adapter between the upstream portion of the piping system and the downstream portion of the piping system.

14. The method of claim 13, further comprising removing the adapter and replacing the removable element.

15. The method of claim 11, wherein the inlet of the first chamber is adapted to receive liquid therethrough, the outlet of the first chamber is adapted to expel liquid therefrom, the inlet of the second chamber is adapted to receive forced gas therethrough, and the outlet of the second chamber is adapted to expel forced gas therefrom.

16. The method of claim 11, wherein the adapter is configured to be received by a housing used to form a portion of a back flow prevention device.

* * * * *

UNITED STATES PATENT AND TRADEMARK OFFICE

CERTIFICATE OF CORRECTION

PATENT NO. : 8,215,328 B2
APPLICATION NO. : 12/773357
DATED : July 10, 2012
INVENTOR(S) : Brad L. Noll et al.

It is certified that error appears in the above-identified patent and that said Letters Patent is hereby corrected as shown below:

Face of the Patent, Column 1, Related U.S. Application Data, Line 3,
insert -- (60) Provisional application No. 60/858,026, filed on Nov. 9, 2006. --

Signed and Sealed this
Sixth Day of November, 2012

David J. Kappos
*Director of the United States Patent and Trademark Office*